United States Patent
Li

(10) Patent No.: US 10,955,706 B2
(45) Date of Patent: Mar. 23, 2021

(54) LIQUID CRYSTAL PANEL STRUCTURES CONTAINING FUNCTIONALIZED GRAPHENE LAYERS AND METHODS OF PREPARING FUNCTIONALIZED GRAPHENE LAYERS

(71) Applicant: Shenzhen China Star Optoelectronics Technology Co., Ltd., Shenzhen (CN)

(72) Inventor: Ji Li, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 236 days.

(21) Appl. No.: 16/382,133

(22) Filed: Apr. 11, 2019

(65) Prior Publication Data
US 2019/0235322 A1    Aug. 1, 2019

Related U.S. Application Data

(62) Division of application No. 15/112,432, filed on Jul. 19, 2016, now Pat. No. 10,310,332.

(30) Foreign Application Priority Data

May 20, 2016    (CN) .......................... 201610340789.4

(51) Int. Cl.
| | | |
|---|---|---|
| G02F 1/1337 | (2006.01) | |
| C09K 19/56 | (2006.01) | |
| G02F 1/1335 | (2006.01) | |
| G02F 1/1343 | (2006.01) | |
| G02F 1/1368 | (2006.01) | |

(52) U.S. Cl.
CPC ........ *G02F 1/133711* (2013.01); *C09K 19/56* (2013.01); *G02F 1/133784* (2013.01); *C09K 2323/021* (2020.08); *G02F 1/1368* (2013.01); *G02F 1/13439* (2013.01); *G02F 1/133514* (2013.01); *G02F 1/133742* (2021.01)

(58) Field of Classification Search
CPC ................................................. G02F 1/133784
See application file for complete search history.

(56) References Cited

U.S. PATENT DOCUMENTS

2013/0281575 A1* 10/2013 Ji .......................... C08K 5/057
                                                                523/455

* cited by examiner

*Primary Examiner* — Ian A Rummel
(74) *Attorney, Agent, or Firm* — Leong C. Lei

(57) ABSTRACT

A method for preparing a functionalized graphene layer is provided. The method utilizes superiority of transparent conductivity of the graphene and modifiability of the graphene surface to endow the graphene with an effect of liquid crystal molecule alignment. Thus, the functionalized graphene layer provides both transparent conductivity and liquid crystal alignment, and an alignment process that subsequently uses an alignment material is not necessary.

7 Claims, 3 Drawing Sheets

Graphene oxide

Providing molecules of alignment function

Functionalization reaction

Functionalized graphene oxide

Step 1, preparing a graphene oxide by utilizing Hummer's method, reacting the obtained graphene oxide with liquid crystal vertical alignment molecules having liquid crystal alignment function, to graft the vertical alignment molecules on a surface of the graphene oxide, to obtain a functionalized graphene oxide;

Step 2, providing a solvent and a substrate, mixing the functionalized graphene oxide with the solvent, and through a sonication, to obtain a uniformly dispersed functionalized graphene oxide dispersion, forming a functionalized graphene oxide film on the substrate by the functionalized graphene oxide dispersion;

Step 3, performing a hydrogen gas reduction treatment to the functionalized graphene oxide film obtained in step 2, to obtain a material that is a functionalized graphene film of graphene surface grafted with liquid crystal vertical alignment molecules.

Fig. 3

LIQUID CRYSTAL PANEL STRUCTURES CONTAINING FUNCTIONALIZED GRAPHENE LAYERS AND METHODS OF PREPARING FUNCTIONALIZED GRAPHENE LAYERS

CROSS REFERENCE TO RELATED APPLICATIONS

This is a divisional application of co-pending U.S. patent application Ser. No. 15/112,432, filed on Jul. 19, 2016, which is a national stage of PCT Application No. PCT/CN2016/085794, filed on Jun. 15, 2016, claiming foreign priority of Chinese Patent Application No. 201610340789.4, filed on May 20, 2016.

FIELD OF THE INVENTION

The present application relates to display technical fields, especially to a liquid crystal panel containing a functionalized graphene layer and a method of preparing a functionalized graphene layer.

BACKGROUND OF THE INVENTION

A thin film transistor liquid crystal display (LCD) device has many advantages of thin body, power saving, no radiation, so it obtains wide range application. Most of the liquid crystal devices in current market are backlight type liquid crystal display, which includes a liquid crystal display panel and a backlight module. The working principle of the liquid crystal display panel is: placing liquid crystal molecules in two parallel glass substrates, which have many vertical and horizontal fine wires between the two glass substrates; controlling the liquid crystal molecules to change direction by energizing or not energizing; and refracting light of the backlight module to produce frames.

Generally, the liquid crystal display panel is consisting of a color filter (CF) substrate, a thin film transistor (TFT) substrate, liquid crystal (LC) interposed between the CF substrate and the TFT substrate, and a sealant. In TFT-LCD, classifications based on operation modes of the liquid crystal have phase change (PC), twisted nematic (TN), super twisted nematic (STN), vertical alignment (VA), and in plane switching (IPS), etc. For the purpose of the common VA display mode, it is needed that a transparent conductive film is simultaneously and respectively disposed on a side, facing the liquid crystal layer, of the CF substrate and the TFT substrate, a main function of the transparent conductive film is to form an electric field between the CF substrate and the TFT substrate, and to drive deflection of the liquid crystal molecules, so as to achieve bright and dark display.

Currently, the conventional transparent conductive film is indium tin oxide (ITO) film prepared by methods of physical vapor deposition (PVD). Additionally, after the transparent conductive films on the TFT substrate and the CF substrate are formed, an alignment film of tens to hundreds nanometers thickness is usually coated or printed thereon, when liquid crystal (LC) is contacted with the alignment film, LC can be allowed to form a pre-inclination angle at a certain direction, so as to provide a load angle for the liquid crystal molecules (a size of the pre-inclination angle has an important influence on driving voltage, contrast ratio, response time, viewing angle of TFT-LCD).

A material of the alignment film is usually chosen polyimide (PI) material, which is mainly classified as rubbing alignment type PI material and an optical alignment type PI material; however, no matter what the type of alignment material is, it has its own shortcoming.

Graphene has excellent transparent conductive and mechanical performances, there are many patents disclose that the graphene is used as transparent conductive films. Methods of forming the transparent conductive graphene layer can be chemical vapor deposition (CVD), CVD-transfer, graphene solution printing, and graphene oxide solution printing-reduction. However, in such patents, the graphene is only used as the transparent electrode layer; after that, it is still needed to perform material and process of the alignment film.

SUMMARY OF THE INVENTION

An aspect of the present application is to provide a liquid crystal panel structure containing a functionalized graphene layer, the functionalized graphene layer thereof simultaneously plays effects of transparent conductivity and liquid crystal alignment, an alignment process that subsequently uses an alignment material is not necessary, the fabrication process and film structures of the liquid crystal display panel are greatly simplified.

Another aspect of the present application is to provide a method of preparing a functionalized graphene layer, the method sufficiently utilizes superiority of transparent conductivity of the graphene, and modifiability of the graphene surface, to endow the graphene with an effect of liquid crystal molecule alignment, the functionalized graphene layer prepared thereby has transparency, conductivity and alignment functions.

To achieve the above aspect, the present application provides a liquid crystal panel structure containing a functionalized graphene layer, including oppositely disposed an upper substrate and a lower substrate, and a liquid crystal layer disposed between the upper substrate and the lower substrate;

a side of the upper substrate near the liquid crystal layer has a functionalized graphene layer disposed thereon;

the functionalized graphene layer is a functionalized graphene film, the functionalized graphene film is a film of graphene surface grafted with liquid crystal vertical alignment molecules;

materials of the liquid crystal layer include liquid crystal molecules, liquid crystal vertical alignment molecules in materials of the functionalized graphene layer graft on the graphene surface, to vertically align the liquid crystal molecules in the liquid crystal layer.

A molecule structural formula of the liquid crystal vertical alignment molecules is

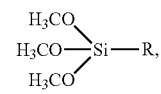

wherein R is

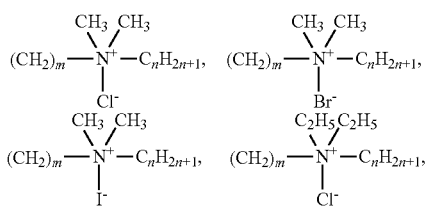

-continued

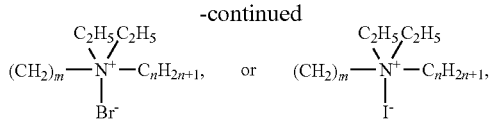

where m is an integer of 1-5 and n is an integer of 15-30.

Optionally, a side of the lower substrate near the liquid crystal layer has a functionalized graphene layer disposed thereon, and a surface of a side of the functionalized graphene layer near the liquid crystal layer has been rubbed, to provide a pre-inclination angle for the liquid crystal molecules in the liquid crystal layer.

Optionally, an ITO electrode layer and an alignment film layer are successively bottom up disposed on a side of the lower substrate near the liquid crystal layer, and the alignment film layer provides a pre-inclination angle for the liquid crystal molecules in the liquid crystal layer.

The upper substrate is a color film substrate, and the lower substrate is a TFT array substrate.

The present application further provides a method of preparing a functionalized graphene film, including following steps:

Step 1, functionalizing a graphene oxide: preparing a graphene oxide by utilizing Hummer's method, reacting the obtained graphene oxide with liquid crystal vertical alignment molecules having liquid crystal alignment function, to graft the vertical alignment molecules on a surface of the graphene oxide, to obtain a functionalized graphene oxide;

Step 2, forming a functionalized graphene oxide film: providing a solvent, mixing the functionalized graphene oxide obtained in Step 1 with the solvent, and through a sonication, to obtain a uniformly dispersed functionalized graphene oxide dispersion; providing a substrate, forming a functionalized graphene oxide film on the substrate by the functionalized graphene oxide dispersion; and Step 3, reducing the functionalized graphene oxide: performing a hydrogen gas reduction treatment to the functionalized graphene oxide film obtained in Step 2, to obtain a material that is a functionalized graphene film of graphene surface grafted with liquid crystal vertical alignment molecules.

A molecule structural formula of the liquid crystal vertical alignment molecules is

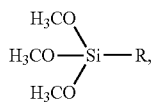

wherein R is

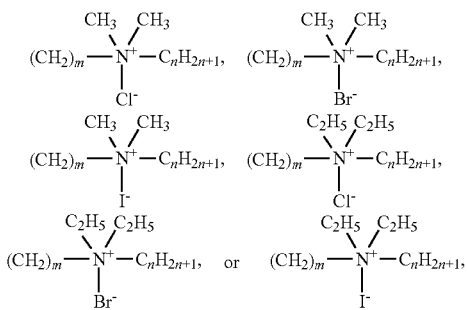

where m is an integer of 1-5 and n is an integer of 15-30.

The solvent provided in Step 2 is a solvent of one or mixing more than one of acetonitrile, acetone, tetrahydrofuran, N-methylpyrrolidone, water, acetone, ethanol, N, N-dimethylformamide, dichloromethane, chloroform, propanol, isopropanol, and ethylene glycol.

Step 3 further includes rubbing the obtained functionalized graphene film.

In Step 2, forming the functionalized graphene oxide film on the substrate by the functionalized graphene oxide dispersion is performed by a method of inkjet printing or transferring.

The present application further provides a method of preparing a functionalized graphene film, including following steps:

Step 1, functionalizing a graphene oxide: preparing a graphene oxide by utilizing Hummer's method, reacting the obtained graphene oxide with liquid crystal vertical alignment molecules having liquid crystal alignment function, to graft the vertical alignment molecules on a surface of the graphene oxide, to obtain a functionalized graphene oxide;

Step 2, forming a functionalized graphene oxide film: providing a solvent, mixing the functionalized graphene oxide obtained in Step 1 with the solvent, and through a sonication, to obtain a uniformly dispersed functionalized graphene oxide dispersion; providing a substrate, forming a functionalized graphene oxide film on the substrate by the functionalized graphene oxide dispersion; and Step 3, reducing the functionalized graphene oxide: performing a hydrogen gas reduction treatment to the functionalized graphene oxide film obtained in Step 2, to obtain a material that is a functionalized graphene film of graphene surface grafted with liquid crystal vertical alignment molecules;

wherein a molecule structural formula of the liquid crystal vertical alignment molecules is

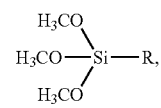

wherein R is

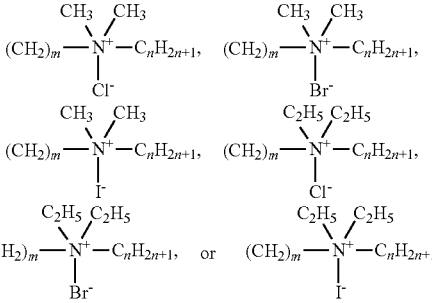

where m is an integer of 1-5 and n is an integer of 15-30; and wherein the solvent provided in step 2 is a solvent of one or mixing more than one of acetonitrile, acetone, tetrahydrofuran, N-methylpyrrolidone, water, acetone, ethanol, N, N-dimethylformamide, dichloromethane, chloroform, propanol, isopropanol, and ethylene glycol.

Advantages of the present application: in the liquid crystal panel structure containing a functionalized graphene layer of the present application, the functionalized graphene layer thereof simultaneously plays effects of transparent conductivity and liquid crystal alignment, an alignment process that subsequently uses an alignment material is not necessary, the fabrication process and film structures of the liquid crystal panel are greatly simplified. In the method of preparing the functionalized graphene layer of the present application, the graphene oxide is firstly prepared by Hummer's method, by reacting the liquid crystal vertical alignment molecules having liquid crystal alignment function with functional groups on the graphene surface, the functionalized graphene oxide is obtained; then, the functionalized graphene oxide film is obtained by film-forming the functionalized graphene oxide; then other functional groups containing oxygen on the functionalized graphene oxide film are reduced to obtain the material that is the functionalized graphene film of graphene surface grafted with liquid crystal vertical alignment molecules. The method of preparing the functionalized graphene layer of the present application sufficiently utilizes superiority of transparent conductivity of the graphene, and modifiability of the graphene surface, to endow the graphene with an effect of liquid crystal molecule alignment, the functionalized graphene layer prepared thereby has transparency, conductivity and alignment functions, and it will also play more obvious superiority in future flexible display and transparent display.

BRIEF DESCRIPTION OF THE DRAWINGS

The technical features and other advantages of the present application will become more readily apparent to those ordinarily skilled in the art, by referring the following detailed description of embodiments of the present application in conjunction with the accompanying drawings.

In the accompanying drawings,

FIG. 3 is a flowchart schematically illustrating a method of preparing a functionalized graphene film of the present application;

DETAILED DESCRIPTION OF PREFERRED EMBODIMENTS

In order to further clarify the technical means adopted in the present application and the effects thereof, the preferable embodiments of the present application and the accompanying drawings thereof will be more specifically described as follows.

Figure 1:
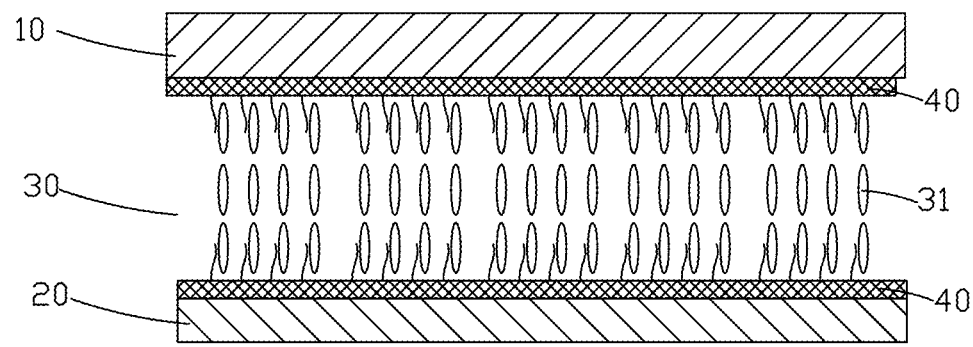
FIG. 1 schematically illustrates a structure of a liquid crystal panel containing functionalized graphene layer according to a first embodiment of the present application.

Referring to FIG. 1, which schematically illustrates a structure of a liquid crystal panel containing functionalized graphene layer according to a first embodiment of the present application, the liquid crystal panel structure containing functionalized graphene layer includes oppositely disposed an upper substrate 10 and a lower substrate 20, and a liquid crystal layer 30 disposed between the upper substrate 10 and the lower substrate 20.

Specifically, a side of the upper substrate 10 near the liquid crystal layer 30 has a functionalized graphene layer 40 disposed thereon.

Specifically, the functionalized graphene layer 40 is a functionalized graphene film, and the functionalized graphene film is a film of graphene surface grafted with liquid crystal vertical alignment molecules.

Specifically, materials of the liquid crystal layer 30 include liquid crystal molecules 31, liquid crystal vertical alignment molecules in materials of the functionalized graphene layer 40 graft on the graphene surface, to vertically align the liquid crystal molecules 31 in the liquid crystal layer 30.

Specifically, a molecule structural formula of the liquid crystal vertical alignment molecules is

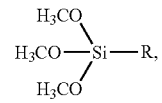

wherein R is

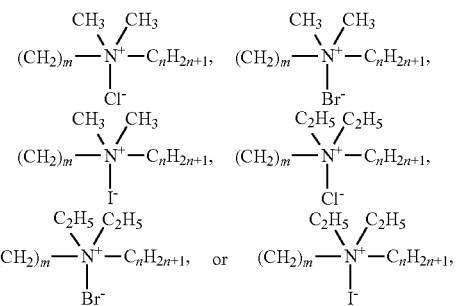

where m is an integer of 1-5 and n is an integer of 15-30; and preferably, in is an integer of 2-4 and n is an integer of 16-24.

Specifically, by forming silicon-oxygen (Si—O) bonds with the graphene, the liquid crystal vertical alignment molecules graft on the graphene surface.

Specifically, in this embodiment, the lower substrate 20 is the same as the upper substrate 10, a side of the lower substrate 20 near the liquid crystal layer 30 has a functionalized graphene layer 40 disposed thereon, a surface of a side of the functionalized graphene layer near the liquid crystal layer 30 has been rubbed, to provide a pre-inclination angle for the liquid crystal molecules 31 in the liquid crystal layer 30.

Specifically, the upper substrate 10 is a color film substrate, and the lower substrate 20 is a TFT array substrate.

Figure 2:
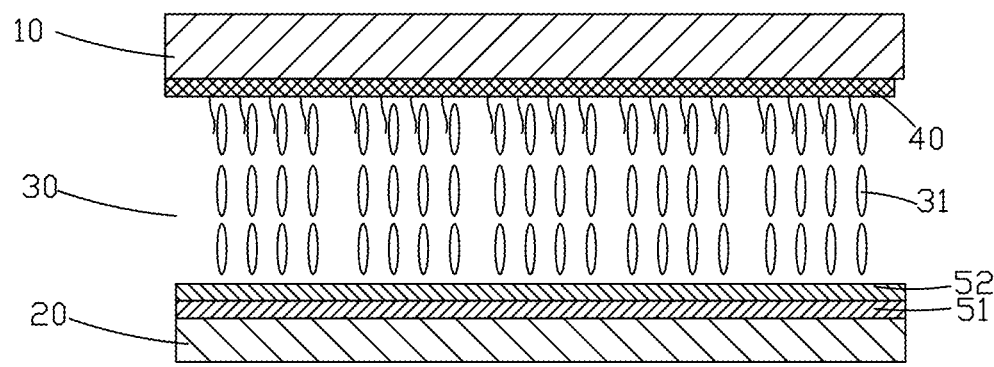
FIG. 2 schematically illustrates a structure of a liquid crystal panel containing functionalized graphene layer according to a second embodiment of the present application.

Referring to FIG. 2, which schematically illustrates a structure of a liquid crystal panel containing functionalized graphene layer according to a second embodiment of the present application, in comparison with the first embodiment, in this embodiment, the functionalized graphene layer 40 is only disposed on the side of the upper substrate 10 near the liquid crystal 30, and an ITO electrode layer 51 and an alignment film layer 52 are successively bottom up disposed on the side of the lower substrate 20 near the liquid crystal layer 30, the alignment film layer 52 provides a pre-inclination angle for the liquid crystal molecules 31 in the liquid crystal layer 30.

In the liquid crystal panel structure containing a functionalized graphene layer of the present application, the functionalized graphene layer thereof simultaneously plays effects of transparent conductivity and liquid crystal alignment, an alignment process that subsequently uses an alignment material is not necessary, the fabrication process and film structures of the liquid crystal panel are greatly simplified.

Referring to FIG. 3, the present application further provides a method of preparing a functionalized graphene film, including following steps.

Step 1, functionalizing a graphene oxide: preparing a graphene oxide by utilizing Hummer's method; reacting the obtained graphene oxide with liquid crystal vertical alignment molecules having liquid crystal alignment function, to graft the vertical alignment molecules on a surface of the graphene oxide, to obtain a functionalized graphene oxide.

Specifically, a molecule structural formula of the liquid crystal vertical alignment molecules is

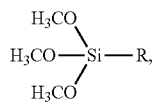

wherein R is

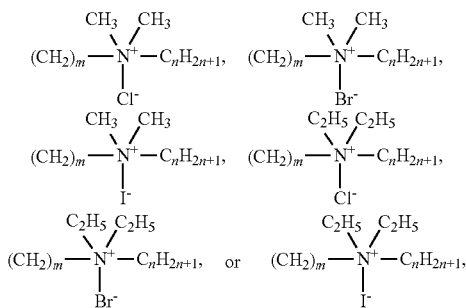

where m is an integer of 1-5 and n is an integer of 15~30; and preferably, in is an integer of 2-4 and n is an integer of 16-24.

Figure 4:
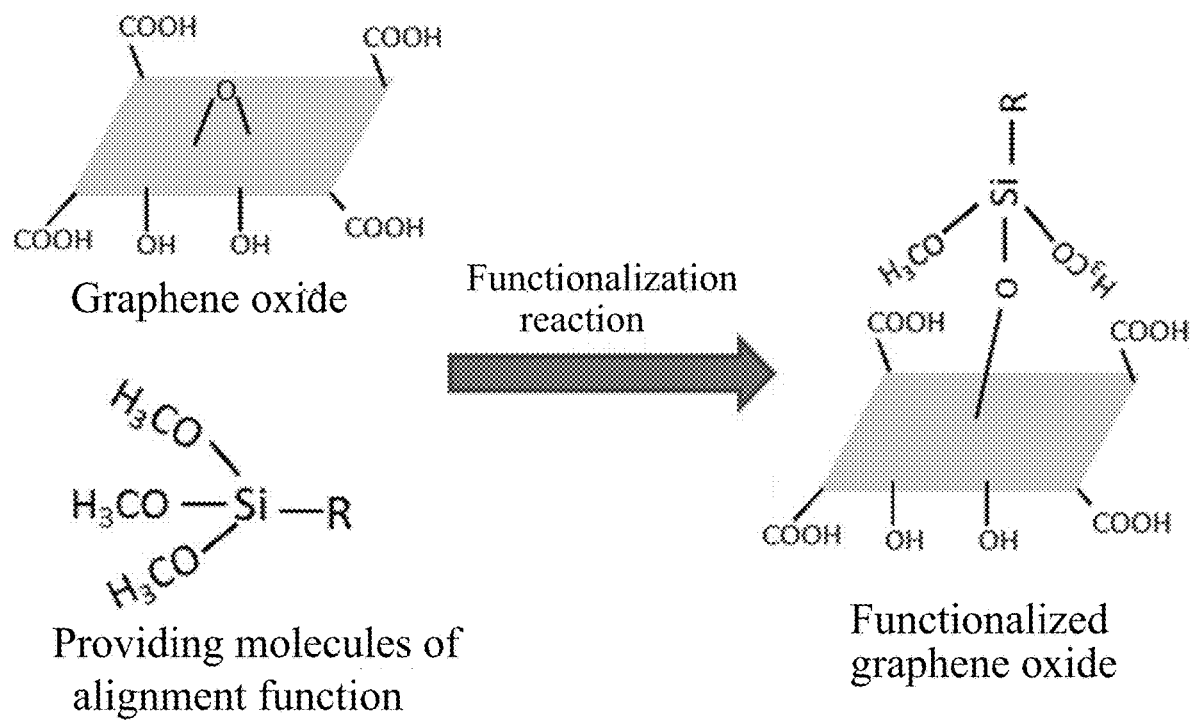
FIG. 4 schematically illustrates a reaction of functionalizing the graphene oxide in step 1 of the method of preparing the functionalized graphene film of the present application.

Specifically, as shown in FIG. 4, the liquid crystal vertical alignment molecules react with the graphene oxide, by forming silicon-oxygen (Si—O) bonds with the graphene oxide, the liquid crystal vertical alignment molecules graft on the graphene oxide surface, to obtain a functionalized graphene oxide.

Step 2, forming a functionalized graphene oxide film: providing a solvent, mixing the functionalized graphene oxide obtained in Step 1 with the solvent, and through a sonication, to obtain a uniformly dispersed functionalized graphene oxide dispersion; providing a substrate, forming a functionalized graphene oxide film on the substrate by the functionalized graphene oxide dispersion.

Specifically, the solvent provided in Step 2 is a solvent of one or mixing more than one of acetonitrile, acetone, tetrahydrofuran, N-methylpyrrolidone, water, acetone, ethanol, N, N-dimethylformamide, dichloromethane, chloroform, propanol, isopropanol, and ethylene glycol.

Specifically, in Step 2, forming the functionalized graphene oxide film on the substrate by the functionalized graphene oxide dispersion is performed by a method of inkjet printing or transferring.

Preferably, in Step 2, forming the functionalized graphene oxide film on the substrate by the functionalized graphene oxide dispersion is performed by the method of inkjet printing.

Step 3, reducing the functionalized graphene oxide: performing a hydrogen gas reduction treatment to the functionalized graphene oxide film obtained in Step 2, to obtain a functionalized graphene film.

Figure 5:
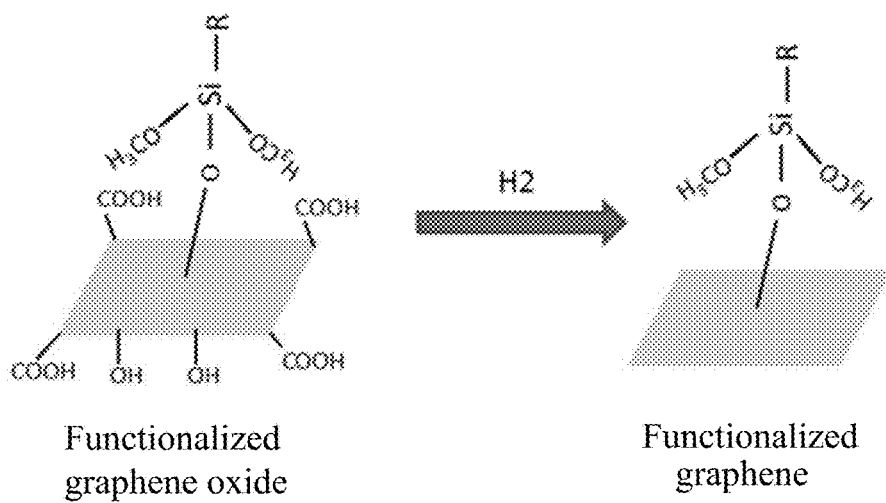
FIG. 5 schematically illustrates a reaction of reducing the functionalized graphene oxide in step 3 of the method of preparing the functionalized graphene film of the present application.

Specifically, as shown in FIG. 5, in Step 3, the hydrogen gas reduction treatment performed to the functionalized graphene oxide allows carbonyl (—CO—), carboxyl (—CO) and hydroxyl (—COOH—) on the graphene oxide in the functionalized graphene oxide be reduced, so as to provide more excellent conductivity and transparency to the graphene, wherein the grafted vertical alignment molecule having alignment function cannot be reduced by the hydrogen gas, and they are retained on the graphene surface.

Specifically, Step 3 further includes rubbing the obtained functionalized graphene film, so as to play the function of providing the pre-inclination angle for the liquid crystal molecules.

The method of preparing the functionalized graphene layer of the present application sufficiently utilizes superiority of transparent conductivity of the graphene, and modifiability of the graphene surface, to endow the graphene with an effect of liquid crystal molecule alignment, the functionalized graphene layer prepared thereby has transparency, conductivity and alignment functions, and it will also play more obvious superiority in future flexible display and transparent display.

In summary, in the liquid crystal panel structure containing a functionalized graphene layer of the present application, the functionalized graphene layer thereof simultaneously plays effects of transparent conductivity and liquid crystal alignment, an alignment process that subsequently uses an alignment material is not necessary, the fabrication process and film structures of the liquid crystal panel are greatly simplified. In the method of preparing the functionalized graphene layer of the present application, the graphene oxide is firstly prepared by Hummer's method, by reacting the liquid crystal vertical alignment molecules having liquid crystal alignment function with functional groups on the graphene surface, the functionalized graphene oxide is obtained; then, the functionalized graphene oxide film is obtained by film-forming the functionalized graphene oxide; then other functional groups containing oxygen on the functionalized graphene oxide film are reduced to obtain the material that is the functionalized graphene film of graphene surface grafted with liquid crystal vertical alignment molecules. The method of preparing the functionalized graphene layer of the present application sufficiently utilizes superiority of transparent conductivity of the graphene, and modifiability of the graphene surface, to endow the graphene with an effect of liquid crystal molecule alignment, the functionalized graphene layer prepared thereby has transparency, conductivity and alignment function, and it will also play more obvious superiority in future flexible display and transparent display.

Based on the above description, an ordinarily skilled in the art can complete various similar modifications and arrangements according to the technical programs and ideas of the present application, and the scope of the appended claims of the present application should encompass all such modifications and arrangements.

What is claimed is:
1. A method for preparing a functionalized graphene film, comprising the following steps:

Step 1, functionalizing a graphene oxide: preparing a graphene oxide by utilizing Hummer's method, reacting the obtained graphene oxide with liquid crystal vertical alignment molecules having liquid crystal alignment function, to graft the vertical alignment molecules on a surface of the graphene oxide, to obtain a functionalized graphene oxide;

Step 2, forming a functionalized graphene oxide film: providing a solvent, mixing the functionalized graphene oxide obtained in Step 1 with the solvent, and through a sonication, to obtain a uniformly dispersed functionalized graphene oxide dispersion; providing a substrate, forming a functionalized graphene oxide film on the substrate by the functionalized graphene oxide dispersion;

Step 3, reducing the functionalized graphene oxide: performing a hydrogen gas reduction treatment to the functionalized graphene oxide film obtained in Step 2, to obtain a material that is a functionalized graphene film of graphene surface grafted with liquid crystal vertical alignment molecules;

wherein a molecule structural formula of the liquid crystal vertical alignment molecules is

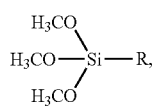

where R is one of

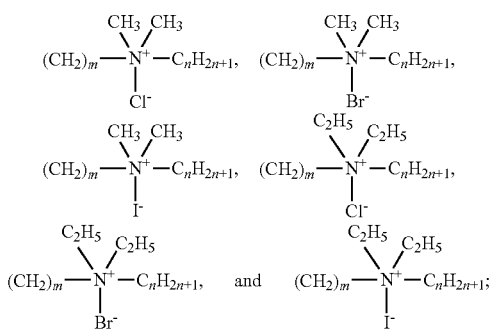

$m$ is an integer of 1-5; and $n$ is an integer of 15-30.

2. The method according to claim 1, wherein the solvent provided in Step 2 is a solvent of one or a mixture of more than one of acetonitrile, acetone, tetrahydrofuran, N-methylpyrrolidone, water, acetone, ethanol, N, N-dimethylformamide, dichloromethane, chloroform, propanol, isopropanol, and ethylene glycol.

3. The method according to claim 1, wherein Step 3 further comprises rubbing the obtained functionalized graphene film.

4. The method according to claim 1, wherein in Step 2, forming the functionalized graphene oxide film on the substrate by the functionalized graphene oxide dispersion is performed by a method of inkjet printing or transferring.

5. A method for preparing a functionalized graphene film, comprising the following steps:

Step 1, functionalizing a graphene oxide: preparing a graphene oxide by utilizing Hummer's method, reacting the obtained graphene oxide with liquid crystal vertical alignment molecules having liquid crystal alignment function, to graft the vertical alignment molecules on a surface of the graphene oxide, to obtain a functionalized graphene oxide;

Step 2, forming a functionalized graphene oxide film: providing a solvent, mixing the functionalized graphene oxide obtained in Step 1 with the solvent, and through a sonication, to obtain a uniformly dispersed functionalized graphene oxide dispersion; providing a substrate, forming a functionalized graphene oxide film on the substrate by the functionalized graphene oxide dispersion;

Step 3, reducing the functionalized graphene oxide: performing a hydrogen gas reduction treatment to the functionalized graphene oxide film obtained in Step 2, to obtain a material that is a functionalized graphene film of graphene surface grafted with liquid crystal vertical alignment molecules;

wherein a molecule structural formula of the liquid crystal vertical alignment molecules is

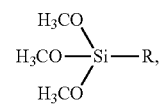

where R is one of

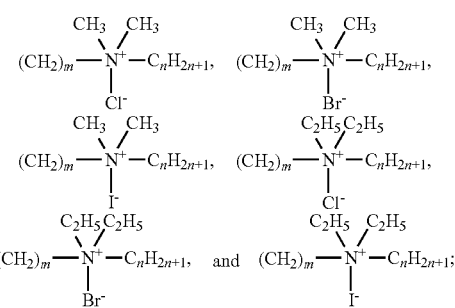

$m$ is an integer of 1-5; and $n$ is an integer of 15-30;

wherein the solvent provided in Step 2 is a solvent of one or a mixture of more than one of acetonitrile, acetone, tetrahydrofuran, N-methylpyrrolidone, water, acetone, ethanol, N, N-dimethylformamide, dichloromethane, chloroform, propanol, isopropanol, and ethylene glycol.

6. The method according to claim 5, wherein Step 3 further comprises rubbing the obtained functionalized graphene film.

7. The method according to claim 5, wherein in Step 2, forming the functionalized graphene oxide film on the substrate by the functionalized graphene oxide dispersion is performed by a method of inkjet printing or transferring.

* * * * *